(12) United States Patent
Maruyama

(10) Patent No.: US 7,600,324 B2
(45) Date of Patent: Oct. 13, 2009

(54) LEVEL

(75) Inventor: Kiyoshi Maruyama, Tsubame (JP)

(73) Assignee: Ebisu Co., Ltd., Niigata (JP)

( * ) Notice: Subject to any disclaimer, the term of this patent is extended or adjusted under 35 U.S.C. 154(b) by 164 days.

(21) Appl. No.: 11/912,966

(22) PCT Filed: Sep. 21, 2005

(86) PCT No.: PCT/JP2005/017391

§ 371 (c)(1),
(2), (4) Date: Oct. 29, 2007

(87) PCT Pub. No.: WO2007/013186

PCT Pub. Date: Feb. 1, 2007

(65) Prior Publication Data

US 2009/0007447 A1    Jan. 8, 2009

(30) Foreign Application Priority Data

Jul. 29, 2005    (JP) .............................. 2005-222172

(51) Int. Cl.
*G01C 9/28* (2006.01)
*G01C 9/00* (2006.01)

(52) U.S. Cl. .............................. 33/384; 33/383; 33/365
(58) Field of Classification Search .................. 33/365, 33/383, 384

See application file for complete search history.

(56) References Cited

U.S. PATENT DOCUMENTS

| | | | | |
|---|---|---|---|---|
| 1,624,161 A * | 4/1927 | Day | ............................. | 33/385 |
| 1,735,413 A * | 11/1929 | Rudolff | ........................ | 33/383 |
| 1,765,060 A * | 6/1930 | De Angelis | ................... | 33/385 |
| 1,815,949 A * | 7/1931 | Marischal | ..................... | 33/383 |
| 2,130,647 A * | 9/1938 | Milner | ........................ | 33/381 |
| 2,487,245 A * | 11/1949 | Hubbard | ...................... | 33/386 |
| 2,770,889 A * | 11/1956 | Allegretti et al. | .............. | 33/385 |
| 5,025,568 A * | 6/1991 | Grimes | ........................ | 33/371 |
| 5,111,589 A * | 5/1992 | Tate | ............................. | 33/385 |
| 5,177,873 A * | 1/1993 | Tate | ............................. | 33/385 |
| 5,506,759 A * | 4/1996 | Shirai et al. | ................. | 362/462 |
| 5,992,033 A * | 11/1999 | Scarborough | ................ | 33/384 |
| 7,472,487 B2 * | 1/2009 | Tran et al. | ..................... | 33/379 |

FOREIGN PATENT DOCUMENTS

| | | |
|---|---|---|
| JP | 11-183168 A | 7/1999 |
| JP | 2001-343236 A | 12/2001 |
| JP | 2002-39752 A | 2/2002 |

* cited by examiner

*Primary Examiner*—Christopher W Fulton
(74) *Attorney, Agent, or Firm*—Sughrue Mion, PLLC

(57) ABSTRACT

A level having a mounting body provided with a bubble tube measuring portion disposed in a container case, the mounting body is adjusted by microrotation in relation to the container case to correct a position of the bubble tube, wherein a shaft insertion hole is provided in the container case and in the mounting body, the shaft member is disposed via the through-hole of the container case and the mounting body, whereby the mounting body can perform microrotations about the shaft member in the container case, the mounting body is provided with an elastic pressure contact portion for making elastic pressure contact with an inner surface of one side of the container case, and a tightening and pressing contact portion for making pressing contact via an adjustment screw for pressing and making contact in a sloped direction with the inner surface on an opposite side facing the container case.

10 Claims, 4 Drawing Sheets

LEVEL

TECHNICAL FIELD

The present invention relates to a level for measuring the levelness or perpendicularity of a measuring plane using a bubble tube measuring portion having a bubble and liquid sealed therein.

BACKGROUND ART

There is a bubble tube measuring portion in which a bubble and liquid are sealed is provided in a container case, and the container case is configured so that the levelness or the perpendicularity of a measurement surface is measured based on the bubble position of the bubble tube measuring portion placed on a desired measurement surface. In such a water level, the bubble tube measuring portion is commonly provided to a mounting body made of resin, the mounting body is disposed inside the container case, and the mounting body is fixed in a prescribed position inside the container case so that the bubble tube measuring portion provided to the container case can be viewed from a window provided to the container case.

When the fixed orientation of the mounting body fixed inside the container case is dislocated, the bubble position of the bubble tube measuring portion provided to the mounting body becomes dislocated. Therefore, many proposals have been made for this type of level, wherein the mounting body inside the container case is adjusted by micromotion (adjusted by microrotation), and the fixed orientation of the mounting body is corrected, i.e., the bubble position of the bubble tube measuring portion is corrected.

In this manner, various configurations have been proposed in prior art as configurations in which the fixed orientation of the mounting body disposed in the container case is corrected in order to correct the bubble position, and a screw is commonly threadably disposed toward the mounting body fixed inside the container case from the exterior of the container case, the mounting body is adjusted by micromotion or microrotation by the amount of threading of the screw to correct the fixed orientation, i.e., to correct the bubble position.

Therefore, these configurations have practical problems in that the screw for correcting the fixed orientation of the mounting body disposed inside the container case and correcting the bubble position is threadably disposed toward the mounting body from the exterior of the container case, and the appearance is poor because the screw is provided in an exposed state in a position that can be seen from the exterior of the case. Also, there are cases in which a spring that is critical for determining the fixed orientation of the mounting body and determining the bubble position by the amount of threading comes into contact with an object, whereby the screw is inadvertently turned, and the fixed orientation of the mounting body and the bubble position become dislocated. In such cases, a cover or another structure must be provided in order to prevent the screw from being exposed.

DISCLOSURE OF THE INVENTION

Problems the Invention is to Solve

An object of the present invention is to further advance research and development of the level proposed in the art, and to provide an excellent level in which a mounting body disposed inside a container case can be fixed inside the container case in a simple manner by merely tightening an adjustment screw; in which the fixed orientation of the mounting body can be adjusted by microrotation to correct the bubble position in a simple manner by merely threadably operating the adjustment screw and adjusting the amount of threading of the adjustment screw; in which the mounting body can, as a matter of course, be reliably fixed in a simple manner in a correct mounted orientation in the container case, and a very good appearance can be obtained because the adjustment screw can be disposed inside the container case; in which there in no concern that adjustment screw will be inadvertently turned and the bubble position dislocated by an impact from the exterior; and in which a simple configuration is obtained, there are few components, and there are no problems of increased costs.

Means for Solving the Problems

The main points of the present invention are described below with reference to the attached drawings.

The first aspect of the present invention relates to a level in which a mounting body 2 provided with a bubble tube measuring portion 1 in which a liquid and a bubble are sealed is disposed in a container case 3, the mounting body 2 is fixed in a prescribed position that allows the bubble tube measuring portion 1 to be viewed from a window hole 4 provided to the container case 3, and the mounting body 2 is adjusted by microrotation in relation to the container case 3 to correct a position of the bubble sealed in the bubble tube measuring portion 1, wherein the level is characterized in that a shaft insertion hole 6 that connects and conforms to a through-hole 5 provided in the container case 3 is disposed in the mounting body 2, the mounting body 2 is disposed inside the container case 3, the shaft member 7 is disposed completely via the through-hole 5 of the container case 3, and the shaft member 7 is insertably disposed in a shaft insertion hole 6 of the mounting body 2, whereby the mounting body 2 can perform microrotations about the shaft member 7 in the container case 3; the mounting body 2 is provided with an elastic pressure contact portion 8 for making elastic pressure contact with an inner surface of one side of the container case 3, and a tightening and pressing contact portion 12 for making pressing contact via an adjustment screw 9 for pressing and making contact with the inner surface on an opposite side facing the container case 3, or via the tightening of an adjustment screw 9 against the inner surface on the opposite side facing the container case 3; the adjustment screw 9 is threadably disposed completely through the mounting body 2 from the threaded portion 10 disposed in the side surface of the mounting body 2 inside the container case 3, and is configured so as to make pressing contact from a sloped direction against the inner surface of the container case 3, or is configured so as to press the tightening and pressing contact portion 12 from a sloped direction against the inner surface of the container case 3; and the adjustment screw 9 is threadably operated to vary the amount of elastic pressure of the elastic pressure contact portion 8 by using the amount of threading of the adjustment screw 9, whereby the mounting body 2 is fixed in the container case 3 and the mounting body 2 is adjusted by microrotation in relation to the container case 3 so that the bubble position of the bubble tube measuring portion 1 can be adjusted.

The level according to the second aspect is the level according the first aspect, characterized in that the mounting body 2 has a shaft insertion hole 6 for insertably fitting the shaft member 7 in one end via the bubble tube measuring portion 1 disposed in the mounting body 2, and an elastic pressure contact portion 8 and a threaded portion 10 are provided to the other end; and the mounting body 2 is configured so as to be capable of being insertably disposed in the container case 3 from the end portion opening 3a of the container case 3, and the adjustment screw 9 is disposed in the mounting body 2 in a state inclined toward the inner surface of the container case 3 from the end portion opening 3a of the container case 3.

The level according to the third aspect is the level according the first or second aspect, characterized in that the elastic pressure contact portion 8 of the mounting body 2 is a bendable curved plate-shaped portion 8 provided to the end portion of the mounting body 2.

The level according to the fourth aspect is the level according the first or second aspect, characterized in that a configuration is provided in which the threaded portion 10 of the mounting body 2 is provided in a state that completely passes through a tapered portion 11 of the end portion of the mounting body 2.

The level according to the fifth aspect is the level according the first or second aspect, characterized in that the mounting body 2 has a configuration in which the elastic pressure contact portion 8 and threaded portion 10 are formed by monolithic molding when the mounting body 2 is molded from a resin.

The level according to the sixth aspect is the level according the third aspect, characterized in that the mounting body 2 has a configuration in which the elastic pressure contact portion 8 and threaded portion 10 are formed by monolithic molding when the mounting body 2 is molded from a resin.

The level according to the seventh aspect is the level according the first or second aspect, characterized in that the shaft member 7 is formed in a columnar or cylindrical shape and is configured to be disposed completely via the through-hole 5 by being pressed into the through-hole 5 of the container case 3; the shaft insertion hole 6 of the mounting body 2 is formed into a shape that substantially conforms to the shaft member 7; and the inner surface of the shaft insertion hole 6 of the mounting body 2 is configured so as to slidably move and micro-rotate in relation to the external peripheral surface of the shaft member 7.

The level according to the eighth aspect is the level according the third aspect, characterized in that the shaft member 7 is formed in a columnar or cylindrical shape and is configured to be disposed completely via the through-hole 5 by being pressed into the through-hole 5 of the container case 3; the shaft insertion hole 6 of the mounting body 2 is formed into a shape that substantially conforms to the shaft member 7; and the inner surface of the shaft insertion hole 6 of the mounting body 2 is configured so as to slidably move and micro-rotate in relation to the external peripheral surface of the shaft member 7.

The level according to the ninth aspect is the level according the fifth aspect, characterized in that the shaft member 7 is formed in a columnar or cylindrical shape and is configured to be disposed completely via the through-hole 5 by being pressed into the through-hole 5 of the container case 3; the shaft insertion hole 6 of the mounting body 2 is formed into a shape that substantially conforms to the shaft member 7; and the inner surface of the shaft insertion hole 6 of the mounting body 2 is configured so as to slidably move and micro-rotate in relation to the external peripheral surface of the shaft member 7.

The level according to the tenth aspect is the level according the sixth aspect, characterized in that the shaft member 7 is formed in a columnar or cylindrical shape and is configured to be disposed completely via the through-hole 5 by being pressed into the through-hole 5 of the container case 3; the shaft insertion hole 6 of the mounting body 2 is formed into a shape that substantially conforms to the shaft member 7; and the inner surface of the shaft insertion hole 6 of the mounting body 2 is configured so as to slidably move and micro-rotate in relation to the external peripheral surface of the shaft member 7.

Effect of the Invention

The configuration of the present invention described above is one in which a mounting body can be fixed in a prescribed position inside a container case with a simple operation in which the mounting body is merely disposed inside the container case, a through-hole in the container case and a shaft insertion hole in the mounting body are aligned, the through-hole and shaft insertion hole are placed in communication, and the adjustment screw is threadably operated.

The work of inserting the mounting body into the container case can be smoothly carried out without elastic pressure or pressing contact between the mounting body and the inner surface of the container case when the mounting body is disposed inside the container case as long as the adjustment screw is threadably operated in the direction opposite from the tightening direction and the adjustment screw or the tightening and pressing contact portion does not make pressing contact with the inner surface of the container case. Therefore, the work of positioning the through-hole of the container case and the shaft insertion hole of the mounting body can be smoothly performed without resistance, and the work of mounting the mounting body can be performed with good efficiency.

The adjustment screw for fixing the mounting body inside the container case is threadably operated, whereby the work of pivotably moving the mounting body a small amount in an arbitrary direction can be carried out. Therefore, the amount of elastic pressure of the elastic pressure contact portion is varied by using the amount of threading of the single adjustment screw, whereby the fixing of the mounting body and the adjustment of the fixed orientation (bubble position correction) can both be reliably performed in a simple manner, the mounting body can be fixed in the container case with very good efficiency, and the number of components can be reduced to reliably improve productivity.

The adjustment screw is threadably disposed in the threaded portion of the mounting body inside the container case from the interior of the container case rather than being threadably disposed toward the mounting body of the container case from the exterior of the container case, and is configured to press the inner surface of the container case or press the tightening and pressing contact portion to the inner surface of the container case. Therefore, the adjustment screw is disposed inside the container case and can be configured so as to be unseen from the exterior, resulting in a good visual appearance. Also, the adjustment screw can be configured so as to avoid exposure to the exterior from the container case, the bubble position is not dislocated due to slight threading movement of the adjustment screw when an object strikes the adjustment screw, and the bubble position corrected by the adjustment screw can be reliably held.

Therefore, the present invention is a very novel level that has high commercial value in which excellent practical effect can be reliably demonstrated in that the bubble position can be held in the correct position without concern that the adjustment screw will be inadvertently turned and the reliability as a measuring device is excellent because the mounting body is disposed inside the container case, the work of aligning the through-hole of the container case and the shaft insertion hole of the mounting body can be smoothly performed, the mounting body can easily be micro-rotatably disposed in a prescribed position inside the container case with a simple operation in which the shaft member is merely disposed completely via the through-hole and shaft insertion hole that are connected in a conforming arrangement, the micro-rotatable mounting body can be fixed inside the container case in a simple manner by merely tightening the adjustment screw, the adjustment screw can be used to perform the work of adjusting the fixed orientation of the mounting body by microrotation, the work of fixing the mounting body by threadably operating a single adjustment screw and the work of adjusting the fixed orientation of the mounting body and correcting the bubble position by microrotation can be reliably performed in a simple manner, the adjustment screw is disposed inside the container case and cannot be seen from the exterior, resulting in a very good appearance, and the adjustment screw can be disposed in a space inside the container case away from the exterior.

KEY

Figure 1:
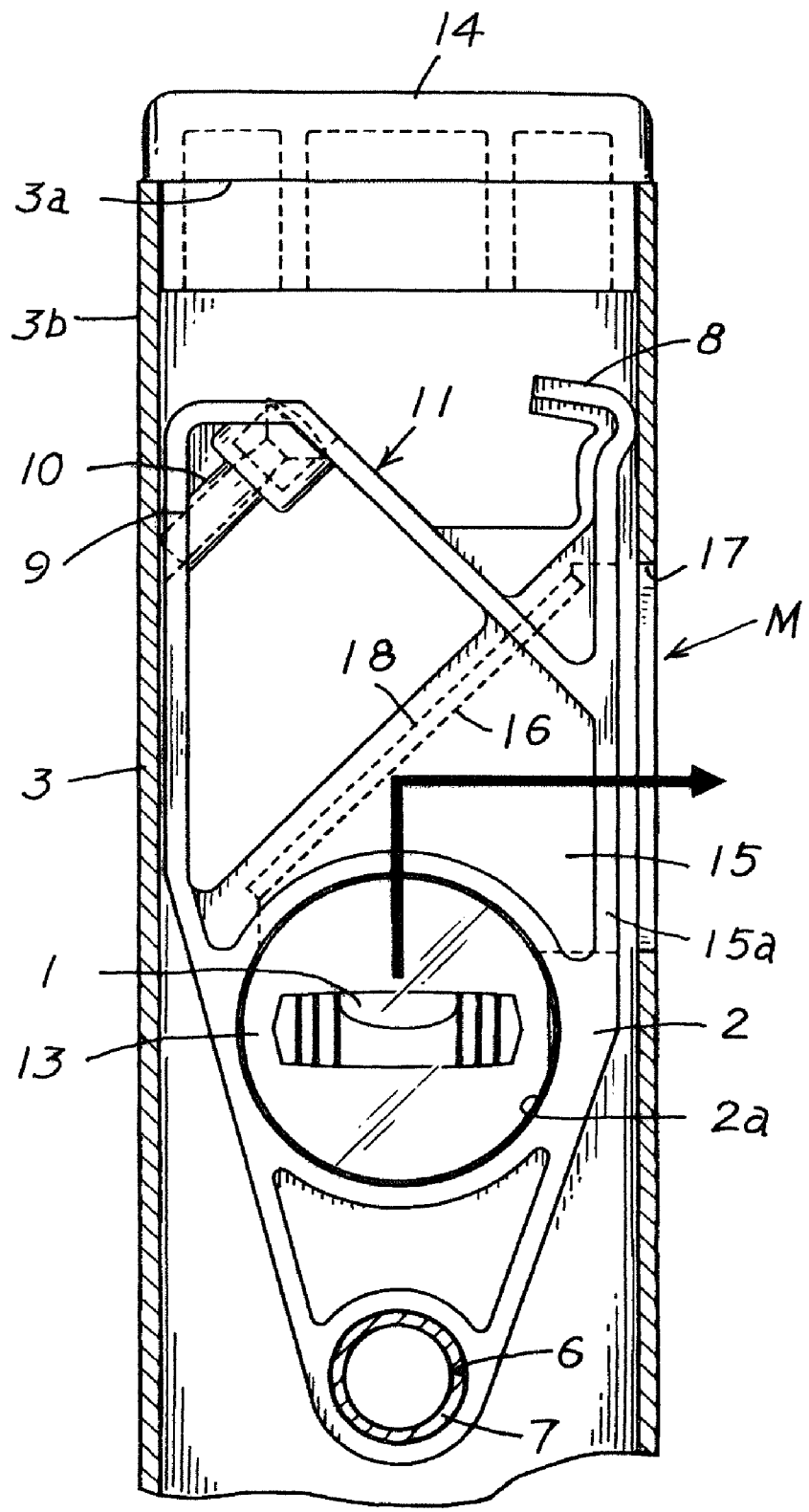
FIG. 1 is a descriptive front cross-sectional view of the level according to the present example.

1 Bubble tube measuring portion
2 Mounting body
3 Container case
3a End portion opening
4 Window hole
5 Through-hole
6 Shaft insertion hole
7 Shaft member
8 Elastic pressure contact portion, curved plate-shaped portion
9 Adjustment screw
10 Threaded portion
11 Tapered portion
12 Tightening and pressing contact portion

BEST MODE FOR CARRYING OUT THE INVENTION

Preferred embodiments (the manner in which the present invention is implemented) of the present invention are briefly described below with reference to the drawings while indicating the effects of the present invention.

A mounting body 2 provided with a bubble tube measuring portion 1 in which a liquid and a bubble are sealed is disposed inside a container case 3, a through-hole 5 formed in the container case 3 and a shaft insertion hole 6 provided to the mounting body 2 are aligned, a shaft member 7 is disposed completely via the through-hole 5 of the container case 3, and the shaft member 7 is insertably disposed in the shaft insertion hole 6 of the mounting body 2, whereby the mounting body 2 can perform microrotations about the shaft member 7 inside the container case 3.

An elastic pressure contact portion 8 of the mounting body 2 makes elastic pressure contact with the inner surface of one side of the container case 3 when an adjustment screw 9 of the mounting body 2, micro-rotatably disposed inside the container case 3, is threadably operated and the adjustment screw 9 is pressed and brought into contact with the inner surface of the container case 3, or the adjustment screw 9 is threadably operated and a tightening and pressing contact portion 12 is pressingly brought into contact with the inner surface of the container case 3 by the tightening of the adjustment screw 9. The tightening and pressing contact portion 12 or the adjustment screw 9 of the mounting body 2 is pressingly brought into contact with inner surface of the side opposite from the container case 3, the pivoting about the shaft member 7 by a small amount is restricted and the mounting body 2 is fixed inside the container case 3, and the bubble tube measuring portion 1 can be disposed in a position that allows the bubble tube measuring portion 1 of the mounting body 2 to be viewed from the window hole 4 provided to the container case 3.

The shaft member 7 is formed, for example, in a columnar or cylindrical shape and pressed into the through-hole 5 of the container case 3, whereby the shaft member 7 is disposed completely via the through-hole 5. The shaft insertion hole 6 of the mounting body 2 is formed into a shape that substantially conforms to the shaft member 7, and the inner surface of the shaft insertion hole 6 of the mounting body 2 can slidably move and micro-rotate in relation to the external peripheral surface of the shaft member 7, whereby the operation for disposing the mounting body 2 in the container case 3 so as to allow micro-rotation can be achieved with a simple operation in which the shaft member 7 disposed all the way via the through-hole 5 of the container case 3 and the shaft insertion hole 6 of the mounting body 2 is prevented from becoming dislodged, work is not required, and the shaft member 7 is merely inserted into the through-hole 5 in a press-fitted state.

In other words, the mounting body 2 can be fixed in a prescribed position inside the container case 3 with a simple operation in which the mounting body 2 is disposed inside the container case 3, the through-hole 5 of the container case 3 and the shaft insertion hole 6 of the mounting body 2 are aligned, the shaft member 7 is passed into the through-hole 5 and shaft insertion hole 6, and the adjustment screw 9 is threadably operated.

The adjustment screw 9 is threadably operated in the opposite direction from the tightening direction and the adjustment screw 9 or the tightening and pressing contact portion 12 is prevented from making pressing contact with the inner surface of the container case 3, whereby the operation of inserting the mounting body 2 into the container case 3 can be smoothly carried out without elastic pressing or pressing contact between the mounting body 2 and the inner surface of the container case 3 when the mounting body 2 is disposed inside the container case. Therefore, the operation of positioning the through-hole 5 of the container case 3 and the shaft insertion hole 6 of the mounting body 2 can be smoothly carried out without resistance, and the operation for mounting the mounting body 2 is performed with good efficiency.

When the mounting body 2 is disposed and fixed inside the container case 3 in this manner, the bubble position of the bubble tube measuring portion 1 disposed in the mounting body 2 becomes dislocated in the event that the fixed orientation of the mounting body 2 becomes dislocated in relation to the container case 3, and since the levelness or perpendicularity cannot be accurately measured, work is required to correctly adjust the fixed orientation of the mounting body 2 and correct the bubble position when the mounting body 2 is fixed inside the container case 3. In the present invention, however, the amount of elastic pressure applied by the elastic pressure contact portion 8 of the mounting body 2 varies depending on the extent to which the adjustment screw 9 of the mounting body 2 is threadably turned, whereby the mounting body 2 can be adjusted by microrotation with respect to the container case 3, the fixed orientation of the mounting body 2 can be corrected, and the bubble position of the bubble tube measuring portion 1 can be corrected in a simple manner.

The elastic pressure contact portion 8 does not require any complex configuration and has good productivity in a configuration in which, for example, the elastic pressure contact portion 8 is used as a bendable curved plate-shaped portion 8 provided to the end portion of the mounting body 2, or in another simple configuration. Also, the mounting body 2 may, for example, be a resin molded article; may be obtained when the elastic pressure contact portion 8, threaded portion 10 into which the adjustment screw 9 is threaded, and other components are monolithically molded when the mounting body 2 is molded from a resin; and ensure efficient production in a simple manner.

In other words, when the adjustment screw 9 is tightened and threadably operated to press and bring the adjustment screw 9 or the tightening and pressing contact portion 12 into contact with one of the inner surfaces of the container case 3, the elastic pressure contact portion 8 of the mounting body 2 makes elastic pressure contact with the inner surface on the opposite side facing the container case 3. Therefore, the elastic pressure contact portion 8 is brought into elastic pressure contact with the inner surface of the container case 3 in accordance with the firmness of the tightening and threadable operation of the adjustment screw 9, and elastically deforms so as to be compressed. The mounting body 2 is therefore micro-rotated by a small amount in the direction of the elastic pressure contact portion 8 by an amount commensurate with the elastic deformation of the elastic pressure contact portion 8. In this manner, the adjustment screw 9 for fixing the mounting body 2 inside the container case 3 is threadably operated, whereby the operation for pivotably moving the mounting body 2 by a small amount in an arbitrary direction can be carried out, and the amount of elastic pressure of the elastic pressure contact portion 8 can be varied by the amount of threading of the single adjustment screw 9. Therefore, the amount of elastic pressure of the elastic pressure contact portion 8 can be varied by varying the amount of threading of the single adjustment screw 9, whereby the mounting body 2 can be reliably fixed and the fixed orientation adjusted (correction of the bubble position) in a simple manner, the mounting body 2 can be fixed to the container case 3 with very good work efficiency, the mounting body 2 has a simple configuration in which few components are used, and production can be simplified and productivity reliably improved.

The adjustment screw 9 is threadably disposed in a state that completely passes through the mounting body 2 from the threaded portion 10 provided to the side surface of the mounting body 2 inside the container case 3. When the adjustment screw 9 is tightened and threadably operated, the adjustment screw 9 makes pressing contact from the slope direction toward the inner surface of the container case 3, or the adjustment screw 9 presses the tightening and pressing contact portion 12 from the slope direction toward the inner surface of the container case 3.

In other words, the adjustment screw 9 is not threadably disposed toward the mounting body 2 inside the container case 3 from the exterior of the container case 3, but is rather threadably disposed in the threaded portion 10 of the mounting body 2 inside the container case 3 from the interior of the container case 3, and is configured so as to press the inner surface of the container case 3 or to press the tightening and pressing contact portion 12 to the inner surface of the container case 3. Therefore, the adjustment screw 9 can be disposed inside the container case 3 so as to remain unseen from the exterior, resulting in a good appearance. The adjustment screw 9 can be configured so as to avoid exposure to the exterior the container case 3, the bubble position is not dislocated due to slight threading movement of the adjustment screw 9 when an object strikes the adjustment screw 9, and a highly reliable configuration can be obtained in which the bubble position corrected by the adjustment screw 9 can be reliably held.

Therefore, the present invention is a very novel level that has high commercial value in which excellent practical effect can be reliably demonstrated in that the bubble can be held in the correct position without concern that the adjustment screw 9 will be inadvertently turned, and the reliability as a measuring device is excellent because the mounting body 2 is disposed inside the container case 3, the work of aligning the through-hole 5 of the container case 3 and the shaft insertion hole 6 of the mounting body 2 can be smoothly performed, the mounting body 2 can be easily micro-rotatably disposed in a prescribed position inside the container case 3 with a simple operation in which the shaft member 7 is merely disposed completely via the through-hole 5 and shaft insertion hole 6 that are connected in a conforming arrangement, the micro-rotatable mounting body 2 can be fixed inside the container case 3 in a simple manner by merely tightening the adjustment screw 9, the adjustment screw 9 can be used to perform the work of adjusting the fixed orientation of the mounting body 2 by microrotation, the work of fixing the mounting body 2 by threadably operating a single adjustment screw 9 and the work of adjusting the fixed orientation of the mounting body 2 and correcting the bubble position by microrotation can be reliably performed in a simple manner, the adjustment screw 9 is disposed inside the container case 3 and cannot be seen from the exterior, resulting in a very good appearance, and the adjustment screw 9 can be disposed in a space inside the container case 3 away from the exterior.

The mounting body 2 may, for example, be configured so as to have a shaft insertion hole 6 into which the shaft member 7 is insertably fitted into one end via the bubble tube measuring portion 1 provided to the mounting body 2, and the elastic pressure contact portion 8 and the threaded portion 10 are provided at the other end. In this configuration, the shaft insertion hole 6 into which the shaft member 7 as a micro-rotatable shaft is insertably disposed, and the threaded portion 10 into which the elastic pressure contact portion 8 and adjustment screw 9 are threadably disposed, are configured so as to be positioned in opposite directions via the bubble tube measuring portion 1. Therefore, the elastic pressure contact portion 8 and threaded portion 10 are in positions set at a distance commensurate with the positioning of the shaft member 7, which is the micro-rotatable shaft of the mounting body 2, and the variation amount (microrotation angle) of the fixed orientation of the mounting body 2 that corresponds to the variation amount of the threading amount of the adjustment screw 9 threadably disposed in the threaded portion 10 is reduced by an amount commensurate with the positioning of the shaft member. Hence, the fixed orientation of the mounting body 2 can be more finely adjusted by threadably operating the adjustment screw 9, and the bubble position of the bubble tube measuring portion 1 can be more accurately corrected. Since the threaded portion 10 is furthermore provided to the end portion of the mounting body 2, the mounting body 2 is configured so as to capable of being insertably disposed inside the container case 3 from the side in which the shaft insertion hole 6 is provided via the end portion opening 3*a* of the container case 3. In such a configuration, the adjustment screw 9 threadably disposed in the threaded portion 10 of the mounting body 2 disposed inside the container case 3 can be threadably operated by inserting a tool from the end portion opening 3*a* of the container case 3, and the fixing and fixed orientation of the mounting body 2 can be adjusted by microrotation (bubble position can be corrected) in a more simple manner.

EXAMPLES

Specific examples of the present invention are described below with reference to the drawings.

The present example is a level in which a mounting body 2 provided with a bubble tube measuring portion 1 in which a liquid and a bubble are sealed is disposed in a container case 3, the mounting body 2 is fixed in a prescribed position that allows the bubble tube measuring portion 1 to be viewed from a window hole 4 provided to the container case 3, and the mounting body 2 is adjusted by microrotation in relation to the container case 3 to correct a position of the bubble sealed in the bubble tube measuring portion 1, wherein the level is configured so that a shaft insertion hole 6 that connects and conforms to a though-hole 5 provided in the container case 3 is disposed in the mounting body 2, the mounting body 2 is disposed inside the container case 3, the shaft member 7 is disposed completely though the though-hole 5 of the container case 3, and the shaft member 7 is insertably disposed in a shaft insertion hole 6 of the mounting body 2, whereby the mounting body 2 can perform microrotations about the shaft member 7 in the container case 3; the mounting body 2 is provided with an elastic pressure contact portion 8 for making elastic pressure contact with an inner surface of one side of the container case 3, and a adjustment screw 9 for making pressing contact with the inner surface on an opposite side facing the container case 3; the adjustment screw 9 is theadably disposed completely though the mounting body 2 from the theaded portion 10 disposed in the side surface of the mounting body 2 inside the container case 3, and is configured so as to make pressing contact from a sloped direction against the inner surface of the container case 3, and is configured so as to pressingly make contact from a sloped direction against the inner surface of the container case 3; and the adjustment screw 9 is theadably operated to vary the amount of elastic pressure of the elastic pressure contact portion 8 by using the amount of theading of the adjustment screw 9, whereby the mounting body 2 is fixed in the container case 3 and the mounting body 2 is adjusted by microrotation in relation to the container case 3 so that the bubble position of the bubble tube measuring portion 1 can be adjusted.

The container case 3 has an end portion opening 3*a* that can be opened and closed by the exposure hole 14, as shown in FIG. 1. The configuration has a window hole 4 for viewing the bubble tube measuring portion 1 of the mounting body 2 provided to the left and right side surfaces.

Figure 3:
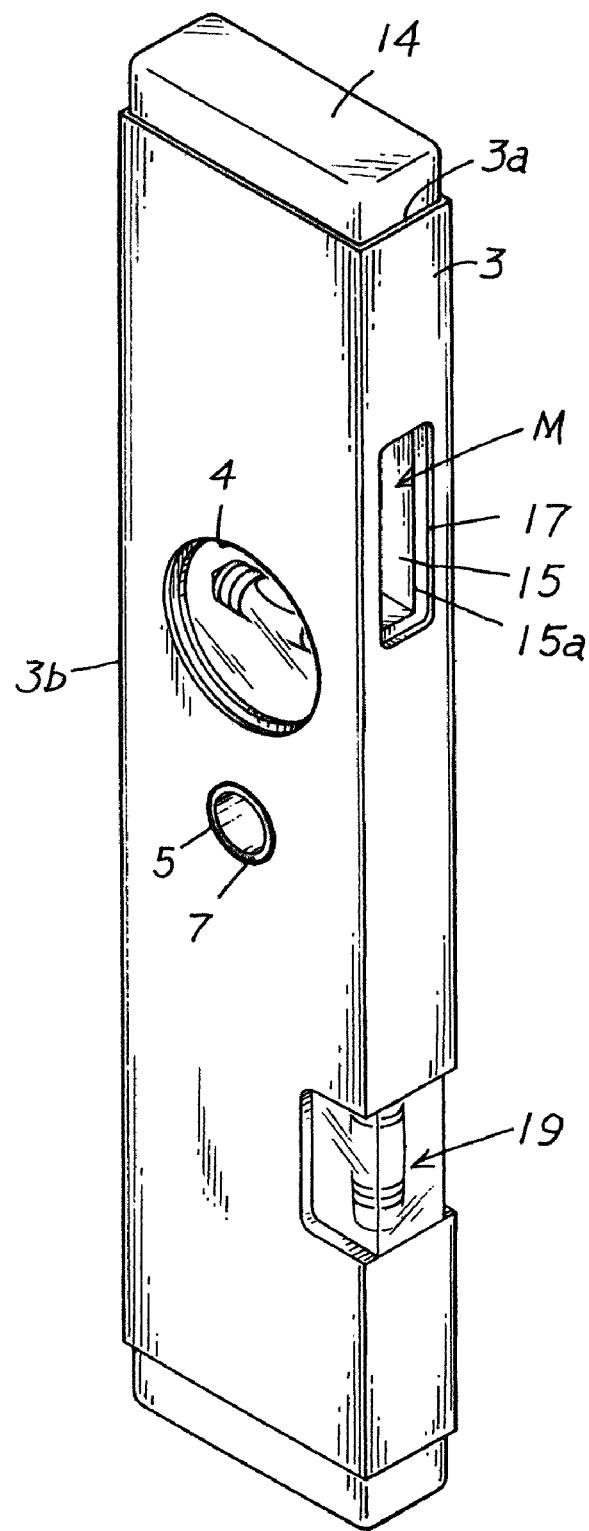
FIG. 3 is a descriptive perspective view showing the in-service state of the level according to the present example.

The side surface that is orthogonal to the side surface provided with the window hole 4 is used as a reference surface 3*b* that is placed in contact with a desired measurement surface. A configuration is provided in which a mirror viewing window hole 17 is provided to the side surface opposite from the reference surface 3*b* for viewing the bubble tube measuring portion 1 via a later-described mirror 16 of a mirror viewing mechanism M of the mounting body 2, as shown in FIG. 3.

Figure 2:
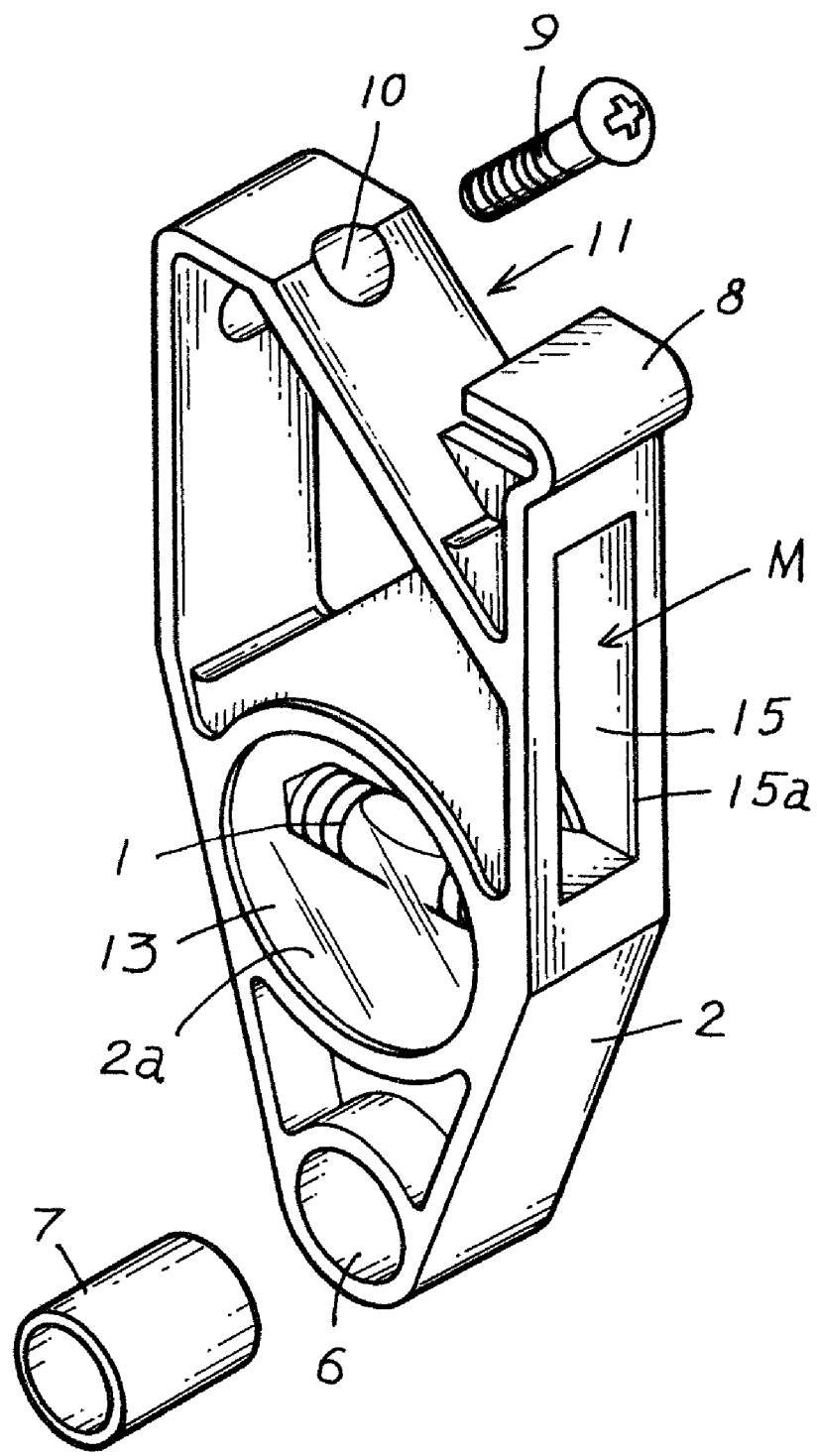
FIG. 2 is a partial descriptive perspective view of the level according to the present example.

The through-hole 5 of the container case 3 is provided to the two side surfaces provided with the window hole 4 of the container case 3, the shaft member 7 is cylindrically formed as shown in FIG. 2, and the shape of the through-hole 5 is set to an inside diameter that substantially conforms to the outside diameter of the shaft member 7. The shaft member 7 may be a columnar shape.

The shaft member 7 is forcibly pressed in via the through-hole 5 provided to the two side surfaces of the container case 3, resulting in a configuration in which the shaft member 7 is pressingly fixed and secured in the through-hole 5. A configuration may be provided in which a bolt and nut, for example, are used as a fastener, the bolt is insertably disposed in the through-hole 5, and the shaft member 7 is secured using the nut.

The mounting body 2 is an article molded from a resin and configured so that a bubble tube measuring device 13 composed of a transparent resin provided with the bubble tube measuring portion 1 is fitted into a mounting and fitting concavity 2*a* formed by monolithic molding in substantially the center position of the mounting body 2, as shown in FIGS. 1 and 2, thus providing the bubble tube measuring portion 1 to the mounting body 2.

The elastic pressure contact portion 8 of the mounting body 2 is used as a bendable curved plate-shaped portion 8 provided to the end portion of the mounting body 2, as shown in FIGS. 1 and 2. The elastic pressure contact portion 8 is provided to a side portion of the opposite side end portion of the shaft insertion hole 6 via the bubble tube measuring portion 1, as shown in FIG. 1. A plurality of curved plate-shaped portions 8 may be provided, but considering the ease of productivity, only one is provided in the present example. The elastic pressure contact portion 8 is not limited to the configuration of the present example, and an elastically deformable configuration having suitable flexibility may be used.

The threaded portion 10 of the mounting body 2 is provided to the opposite side portion of the curved plate-shaped portion 8 on the end portion of the side opposite from the shaft insertion hole 6 by way of the bubble tube measuring portion 1, as shown in FIG. 1.

The threaded portion 10 has a configuration in which the adjustment screw 9 is threadably disposed in the threaded portion 10, and the mounting body 2 is insertably disposed inside the container case 3 from the end portion opening 3*a* of the container case 3. In such a configuration, the threaded portion 10 is set so that the adjustment screw 9 can be threaded in an inclined state from the end portion opening 3*a* of the container case 3 toward the inner surface of the container case 3, as shown in FIG. 1. Specifically, a tapered portion 11 is formed at the end portion of the mounting body 2 and the threaded portion is provided in a state that completely passes through the tapered portion 11, as shown in FIGS. 1 and 2. In other words, the threaded portion 10 is provided to the tapered portion 11 that makes it easier to threadably dispose the adjustment screw 9 in an inclined state completely through the tapered portion, whereby a configuration is provided in which the adjustment screw 9 can be threadably disposed in a smooth manner in the mounting body 2 in a state that completely passes through the tapered portion at an incline. The tapered shape of the tapered portion 11 allows a space to be provided for the elastic pressure contact portion 8 (curved plate-shaped portion 8) in the vicinity (a straight line position in FIG. 1) of the threaded portion 10 of the mounting body 2, and the mounting body 2 can be given a more compact shape.

Figure 4:
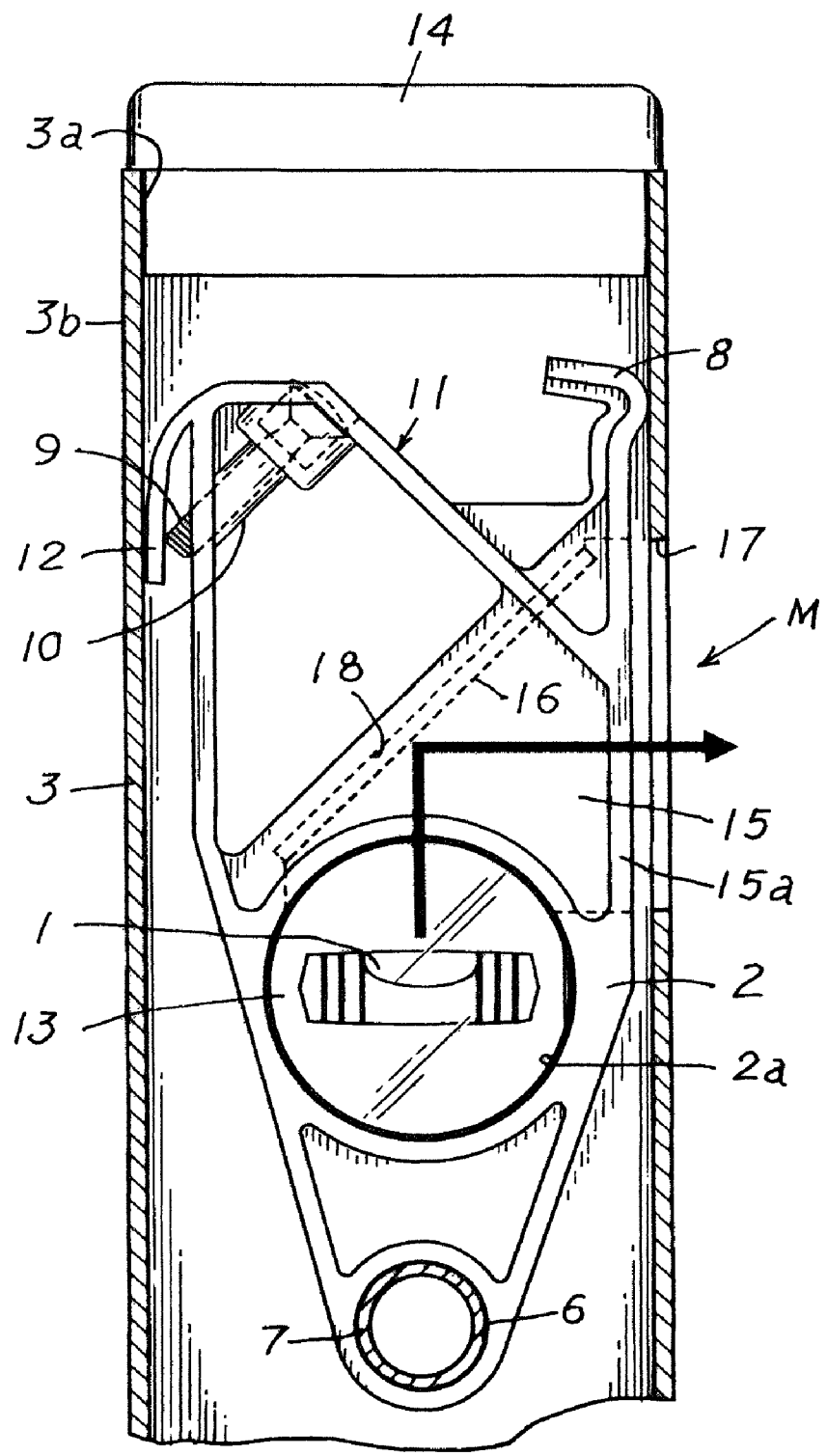
FIG. 4 is a descriptive front cross-sectional view showing another example of the level according to the present example.

In the present example, a configuration is provided in which the distal end of the adjustment screw 9 is in direct pressing contact with the inner surface of the container case 3, but a configuration is also possible in which, for example, a tightening and pressing contact portion 12 that pressingly contacts the inner surface of the container case 3 via the tightening of the adjustment screw 9 is provided to the mounting body 2, and the pressing contact with the inner surface of the container case 3 can be achieved by using the adjustment screw 9 via the tightening and pressing contact portion 12, as shown in FIG. 4. In this case, a configuration is provided in which the mounting body 2 is monolithically molded from a resin as a configuration having suitable flexibility for pressing deformation when the adjustment screw 9 applies a tightening force to the tightening and pressing contact portion 12, and the amount of pressing deformation of the tightening and pressing contact portion 12 and the amount of elastic pressure of the elastic pressure contact portion 8 (curved plate-shaped portion 8) is varied by the amount of threading of the adjustment screw 9, whereby the fixed orientation of the mounting body 2 can be adjusted by microrotation.

The shaft insertion hole 6 of the mounting body 2 is formed into a hole shape that has a circular cross section with a uniform inside diameter that substantially conforms to the inside diameter of the shaft member 7, as shown in FIGS. 1 and 2. The inner surface of the shaft insertion hole 6 of the mounting body 2 slides and moves against the external peripheral surface of the shaft member 7 due to the slight clearance between the shaft insertion hole 6 and the shaft member 7, and the shapes of the shaft insertion hole 6 and the shaft member 7 are set so that the mounting body 2 is pivotably disposed with respect to the shaft member 7.

The elastic pressure contact portion 8 (curved plate-shaped portion 8), the threaded portion 10, and the shaft insertion hole 6 of the mounting body 2 are configured so as to be monolithically molded when the mounting body 2 is molded from a resin.

Therefore, the mounting body 2 has excellent productivity in which efficient mass production is made possible by resin-molding.

The mirror viewing mechanism M is provided to the mounting body 2, and when the mounting body 2 is disposed and fixed inside the container case 3, not only is the bubble tube measuring portion 1 of the mounting body 2 viewable from the window hole 4 of the container case 3, but the bubble tube measuring portion 1 can also be viewed via the mirror 16 from the mirror-viewing window hole 17 provided to a different side surface than the window hole 4 of the container case 3.

The mirror viewing mechanism M has a configuration in which the mounting body 2 has a light guide channel 15 that is in communication with the upper portion of a mounting inset concavity 2a into which the bubble tube measuring device 13 of the bubble tube measuring portion 1 of the mounting body 2 is fitted, as shown in FIG. 1. The light guide channel 15 is in communication with the light guide opening portion 15a of the side portion of the mounting body 2 from the upper portion of the mounting inset concavity 2a, a sloped surface 18 is formed in a midway position of the light guide channel 15, and the sloped surface 18 is disposed along the mirror 16.

Therefore, when the mounting body 2 has been disposed and fixed inside the container case 3, the mirror viewing mechanism M makes it possible to reflect the upper portion of the bubble tube measuring portion 1 of the mounting body 2 from the mirror 16 of the light guide channel 15 and to view the portion through the mirror-viewing window hole 17 of the container case 3 via the light guide opening portion 15a, as shown in FIG. 1.

In the diagram, the reference numeral 19 is a levelness measuring bubble tube 19, and when the reference surface 3b of the container case 3 is placed on a desired measurement surface, the levelness of the measurement surface can be measured by the levelness measuring bubble tube 19.

Configured in the manner described above, the present example makes it possible to perform work very smoothly in that the adjustment screw 9 of the mounting body 2 is threadably operated in the direction opposite from the tightening direction into the container case 3 from the end portion opening 3a of the container case 3 when the mounting body 2 is insertably disposed from the side on which the shaft insertion hole 6 is provided, whereby the mounting body 2 can be smoothly inserted without resistance into a prescribed deep position in the container case 3, and the shaft member 7 can be disposed completely through the hole in accordance with the position between the shaft insertion hole 6 of the mounting body 2 and the through-hole 5 of the container case 3. This is because the mounting body 2 can be inserted deep into the container case 3 without the elastic pressure contact portion 8 and adjustment screw 9 of the mounting body 2 making elastic pressure contact or pressing contact with the inner surface of the container case 3. The shaft member 7 is also provided in a retainable state in the through-hole 5 by merely forcibly press fitting the shaft member 7 completely via the through-hole 5 of the container case 3, and the shaft member 7 can be provided in a retainable state in the through-hole 5. The work can be advanced with good efficiency in this respect as well.

In this manner, the adjustment screw 9 threadably disposed in the mounting body 2, which can be micro-rotated via the shaft member 7 inside the container case 3, can be threadably operated in a simple manner by inserting a tool from the end portion opening 3a of the container case 3. By threadably operating the adjustment screw 9, the work of fixing the mounting body 2 in the container case 3 and micro-rotatably correcting the mounted orientation of the mounting body 2 can be carried out by threadably operating the single adjustment screw 9, and the mounting body 2 can be fixed in the container case 3 with good accuracy.

The mounting body 2 is a resin-molded article, and the elastic pressure contact portion 8, the threaded portion 10, the shaft insertion hole 6 of the mounting body 2, or another component for fixing the mounting body 2 inside the container case 3 is monolithically molded when the mounting body 2 as such is molded from a resin. Using a monolithically molded article provides an excellent solution in terms of cost and productivity because there are few components and mass production is easily achieved.

Therefore, the present example is a very novel level that has high commercial value in that the bubble position can be held in the correct position without concern that the adjustment screw 9 will be inadvertently turned, the reliability as a measuring device is excellent, a simple configuration is used, components are few, and mass production is facilitated, resulting in excellent practical effect in terms of productivity and cost because the mounting body 2 is disposed inside the container case 3, the work of aligning the through-hole 5 of the container case 3 and the shaft insertion hole 6 of the mounting body 2 can be smoothly performed, the mounting body 2 can easily be micro-rotatably disposed in a prescribed position inside the container case 3 with a simple operation in which the shaft member 7 is merely disposed all the way via the through-hole 5 and shaft insertion hole 6 that are connected in a conforming arrangement, the micro-rotatable mounting body 2 can be fixed inside the container case 3 in a simple manner by merely tightening the adjustment screw 9, the adjustment screw 9 can be used to perform the work of adjusting the fixed orientation of the mounting body 2 by microrotation, the work of fixing the mounting body 2 by threadably operating a single adjustment screw 9 and the work of adjusting the fixed orientation of the mounting body 2 and correcting the bubble position by microrotation can be reliably performed in a simple manner, the adjustment screw 9 is disposed inside the container case 3 and cannot be seen from the exterior, resulting in a very good appearance, and the adjustment screw 9 can be disposed in a space inside the container case 3 away from the exterior.

The present invention is not limited to the present example, and specific configurations of the constituent elements can be suitably designed.

The invention claimed is:

1. A level in which a mounting body provided with a bubble tube measuring portion in which a liquid and a bubble are sealed is disposed in a container case, the mounting body is fixed in a prescribed position that allows said bubble tube measuring portion to be viewed from a window hole provided to the container case, and the mounting body can micro-rotate in relation to the container case to correct a position of the bubble sealed in the bubble tube measuring portion, said level characterized in that:

a shaft insertion hole that connects and conforms to a through-hole provided in said container case is disposed in said mounting body, the mounting body is disposed inside said container case, a shaft member is disposed completely via the through-hole of the container case, and the shaft member is insertably disposed in a shaft insertion hole of the mounting body, whereby the mounting body can perform microrotations about the shaft member in the container case;

the mounting body is provided with an elastic pressure contact portion for making elastic pressure contact with an inner surface of one side of the container case, and a tightening and pressing contact portion for making pressing contact via an adjustment screw for pressing and making contact with the inner surface on an opposite side facing the container case, or via the tightening of an adjustment screw against the inner surface on the opposite side facing the container case;

the adjustment screw is threadably disposed completely through the mounting body from the threaded portion disposed in the side surface of the mounting body inside the container case, and is configured so as to make pressing contact from a sloped direction against the inner surface of the container case, or is configured so as to press said tightening and pressing contact portion from a sloped direction against the inner surface of the container case; and the adjustment screw is threadably operated to vary the amount of elastic pressure of said elastic pressure contact portion by using the amount of threading of the adjustment screw, whereby the mounting body is fixed in the container case and the mounting body is adjusted by microrotation in relation to the container case so that the bubble position of the bubble tube measuring portion can be adjusted.

2. The level according to claim 1, characterized in that a configuration is provided in which said mounting body has a shaft insertion hole for insertably fitting said shaft member in one end via the bubble tube measuring portion disposed in the mounting body, and an elastic pressure contact portion and a threaded portion are provided to the other end; and the mounting body is configured so as to be capable of being insertably disposed in the container case from the end portion opening of the container case, and said adjustment screw is disposed in the mounting body in a state inclined toward the inner surface of the container case from the end portion opening of the container case.

3. The level according to claim 1 or 2, characterized in that the elastic pressure contact portion of said mounting body is a bendable curved plate-shaped portion provided to the end portion of the mounting body.

4. The level according to claim 1 or 2, characterized in that a configuration is provided in which the threaded portion of said mounting body is provided in a state that completely passes through a tapered portion of the end portion of the mounting body.

5. The level according to claim 1 or 2, characterized in that said mounting body has a configuration in which said elastic pressure contact portion and threaded portion are formed by monolithic molding when the mounting body is molded from a resin.

6. The level according to claim 1 or 2, characterized in that said shaft member is formed in a columnar or cylindrical shape and is configured to be disposed completely via the through-hole by being pressed into the through-hole of the container case;

the shaft insertion hole of said mounting body is formed into a shape that substantially conforms to the shaft member; and the inner surface of the shaft insertion hole of the mounting body is configured so as to slidably move and micro-rotate in relation to the external peripheral surface of the shaft member.

7. The level according to claim 3, characterized in that said mounting body has a configuration in which said elastic pressure contact portion and threaded portion are formed by monolithic molding when the mounting body is molded from a resin.

8. The level according to claim 7, characterized in that said shaft member is formed in a columnar or cylindrical shape and is configured to be disposed completely via the through-hole by being pressed into the through-hole of the container case;

the shaft insertion hole of said mounting body is formed into a shape that substantially conforms to the shaft member; and the inner surface of the shaft insertion hole of the mounting body is configured so as to slidably move and micro-rotate in relation to the external peripheral surface of the shaft member.

9. The level according to claim 3, characterized in that said shaft member is formed in a columnar or cylindrical shape and is configured to be disposed completely via the through-hole by being pressed into the through-hole of the container case;

the shaft insertion hole of said mounting body is formed into a shape that substantially conforms to the shaft member; and the inner surface of the shaft insertion hole of the mounting body is configured so as to slidably move and micro-rotate in relation to the external peripheral surface of the shaft member.

10. The level according to claim 5, characterized in that said shaft member is formed in a columnar or cylindrical shape and is configured to be disposed completely via the through-hole by being pressed into the through-hole of the container case;

the shaft insertion hole of said mounting body is formed into a shape that substantially conforms to the shaft member; and the inner surface of the shaft insertion hole of the mounting body is configured so as to slidably move and micro-rotate in relation to the external peripheral surface of the shaft member.

* * * * *